(12) United States Patent
Rafat et al.

(10) Patent No.: US 8,028,068 B2
(45) Date of Patent: Sep. 27, 2011

(54) SYSTEM USING A LOCKBOX DEVICE FOR RELEASING FINANCIAL INFORMATION FROM AN INFORMATION EMBARGO SETTING

(75) Inventors: Armughan Rafat, Franklin Park, NJ (US); Karl J. Meissner, Windham, NH (US)

(73) Assignee: Thomson Reuters (Markets) LLC., New York, NY (US)

( * ) Notice: Subject to any disclaimer, the term of this patent is extended or adjusted under 35 U.S.C. 154(b) by 126 days.

(21) Appl. No.: 12/634,087

(22) Filed: Dec. 9, 2009

(65) Prior Publication Data

US 2011/0138077 A1    Jun. 9, 2011

(51) Int. Cl.
*G06F 15/173* (2006.01)
(52) U.S. Cl. ......................... 709/225; 709/217; 709/218
(58) Field of Classification Search .................. 709/225, 709/217, 218; 705/9; 370/390; 345/745; 455/411; 726/26
See application file for complete search history.

(56) References Cited

U.S. PATENT DOCUMENTS

| | | | |
|---|---|---|---|
| 6,414,561 B1 | 7/2002 | Pischl | 333/12 |
| 6,512,804 B1 | 1/2003 | Johnson et al. | 375/372 |
| 2004/0001087 A1* | 1/2004 | Warmus et al. | 345/745 |
| 2006/0198208 A1 | 9/2006 | Witchey et al. | 365/189.05 |
| 2008/0175159 A1 | 7/2008 | Caveney et al. | 370/248 |
| 2009/0106848 A1* | 4/2009 | Coley | 726/26 |
| 2009/0164293 A1* | 6/2009 | Coley | 705/9 |
| 2009/0203355 A1* | 8/2009 | Clark | 455/411 |
| 2009/0274152 A1* | 11/2009 | Edelstein et al. | 370/390 |

* cited by examiner

*Primary Examiner* — Le Luu
(74) *Attorney, Agent, or Firm* — Pillsbury Winthrop Shaw Pittman LLP

(57) ABSTRACT

Information is electronically transmitted from an information embargo setting. The latency and/or lag in releasing information from the information embargo setting is reduced to facilitate dissemination of the embargoed information faster than other entities. The entity controlling the release of information in the information embargo setting may include one or more of a governmental agency (e.g., associated with the United States government, associated with the Canadian government, associated with the European Union and/or one or more states included therein, and/or other agencies associated with other governments), and/or other entities.

37 Claims, 4 Drawing Sheets

SYSTEM USING A LOCKBOX DEVICE FOR RELEASING FINANCIAL INFORMATION FROM AN INFORMATION EMBARGO SETTING

FIELD OF THE INVENTION

The invention relates to a system and method for releasing information from an information embargo setting, and in particular for enhancing the speed with which information is transmitted through a lockbox device associated with and/or controlled by an entity managing the release of information within the information embargo setting.

BACKGROUND OF THE INVENTION

Certain market moving data, such as economic data, may be released to news organizations and/or other entities in a secure information embargo setting in which all communications with the outside world are prohibited until a designated "release time." The embargoed information may be provided to news organizations and/or other entities in such a manner so that each entity receives the information simultaneously and has substantially the same opportunity to provide the information to their clients in a timely manner.

For example, a governmental entity, such as the Department of Labor, may release important economic statistics (e.g., employment data) in a secure information embargo setting to a selected group of news agencies. Typically, an information embargo setting may have a workspace where the journalists and/or other users can work on computing platforms, such as laptops, workstations, and/or other computing platforms. Most entities that receive information in the information embargo setting have permanent equipment stationed in the information embargo setting, which may be connected by Wide Area Network (WAN) circuits to their network, data center, clients, and/or other entities.

During an "embargo period," all communications from the computing platforms located within the information embargo setting are disabled, for example, by using an isolation switch within a lockbox device interconnected between a set of computing platforms and their external communications, such as a WAN. After the embargoed information is communicated to the journalists, the journalists are allowed to digest and/or read the information under embargo and are allowed to prepare a transmission (e.g., story, data, and/or other transmissions) to be transmitted out of the information embargo setting (e.g., to their network, to their subscribers, and/or other entities) at the "release time."

In many information embargo settings, the network communications are restored at exactly the "release time" by opening the isolation switches in the lockboxes that connect the computing platforms with external communications. These sites may be referred to as "no grace" sites.

Conventional solutions for compressing the transmission time of embargoed information after "release time" have automated much of the transmission process, and have focused on the optimization of the network. Other solutions have been focused on improving software applications executed on the computing platforms, and routing used to distribute the data out of the information embargo setting (e.g., increasing line bandwidth or reducing data packet size or removing the number of servers the data travels through).

SUMMARY

One aspect of the invention relates to electronically transmitting information from an information embargo setting (e.g., as described supra). The latency and/or lag in releasing information from the information embargo setting is reduced to facilitate dissemination of the embargoed information faster than other entities. The information released in the information embargo setting may include financial information, economic statistics, market data, and/or other types of information. The entity controlling the release of information in the information embargo setting may include one or more of a governmental agency (e.g., associated with the United States government, associated with the Canadian government, associated with the European Union and/or one or more states included therein, and/or other agencies associated with other governments), third parties contracted to implement the embargo and lockup infrastructure on behalf other agencies, and/or other entities.

In some implementations, a system configured to release information from an information embargo setting through a lock box device at an enhanced speed may include one or more of a computing platform, a router, an upstream communication device, a downstream communication device, and/or other components.

The computing platform may enable a user to input information, such as the information received by the user in the information embargo setting to the system. The user may input the information to the computing platform via manual input (e.g., by typing a release or story), via electronic information transfer (e.g., download), and/or by other techniques for inputting information to a computing platform.

Information is communicated to and from computing platform by other components of the system via a platform port provided on the computing platform. For example, the platform port may include an Ethernet port.

The router may be configured to enable external communication to and from the system. For example, the router may communicate with one or more servers, or other electronic components, over a long haul circuit. For instance, the router may enable communication to and from the system via the Internet, other Wide Area Networks, discrete electronic connection with a computing platform located remote from the system, and/or other information recipients and/or information sources. It will be appreciated that the reference to a router herein is merely illustrative to describe a component that enables information to be passed to and from the system. In some implementations, the router may include one or more of a router, a switch, a gateway, a hub, and/or other networking or communications components. The router may include a router port. The router port may provide an interface between the router and the rest of the system. For example, the router port may include an Ethernet port, and/or other communication ports.

The lockbox device may be configured to selectively connect and disconnect the computing platform with the router. The lockbox device may selectively break the circuit between the computing platform and the router, thereby isolating the computing platform from the router to embargo information held and/or stored on the computing platform from components external to the system. The lockbox device may include one or more relays that are controllable to connect and/or disconnect signal paths between the computing platform and the router (and/or the components connected between the lockbox device and the computing platform or the router). If power in the lockbox device is low or off, the one or more relays may be open, thereby disconnecting the signal paths. When power in the lockbox device goes high, the one or more relays may close, thereby connecting the signal paths to enable the transmission of information between the computing platform and the router.

The lockbox device may be associated with an entity managing the release of information in the information embargo setting. By way of non-limiting example, the lockbox device may be associated with, provided by, and/or controlled by a governmental agency, a news organization, a financial institution, a third party entrusted with implementing the embargo, and/or other entities that manage the release of information in an information embargo setting. As such, the construction and/or operation of the lockbox device may be imposed on the user or entity implementing the system to release information from the information embargo setting. During operation in an information embargo setting, control over the lockbox device to selectively open or close the relays may be exercised by the entity controlling the release of information. This control may include manual control by an individual or group of individuals, or may include automated control. For example, automated control over the lockbox device may include configuring the lockbox device to open automatically in response to a timer. The timer may be set by the entity managing the information embargo setting.

During assembly of the system, a user, and/or an entity associated with the user, may transport one or more of the computing platform, the upstream communication device, the downstream communication device, and/or the router into a facility in which the embargoed information will be released to the user. The user and/or an entity associated with the user may interconnect one or more of the computing platform, the upstream communication device, the lockbox, the downstream communication device, and/or the router in the manner described. The connections maintain the embargo network connectivity.

Although lockbox devices of various configurations may be used, in some implementations, the lockbox device includes a plurality of upstream communication ports, and a plurality of downstream communication ports. The upstream communication ports may be configured to communicate information between the lockbox device and components of the system that are located upstream from the lockbox device. The downstream communication ports may be configured to communicate information between the lockbox device and components of the system that are located downstream from the lockbox device.

For the purposes of this disclosure, "downstream" and "upstream" are defined with respect to flows of information that travel from the computing platform to the router (such as information released from the information embargo setting). According to this definition of "upstream" and "downstream," the computing platform and the upstream communication device are upstream from the lockbox device, while the router and the downstream communication device are downstream from the lockbox device. It will be appreciated that this does not dictate the direction of all flows of information within the system. Instead, this is merely used as a naming convention that facilitates description of the components of the system.

The upstream communication ports may include a number of different types of ports configured to receive corresponding connectors. The upstream communication ports may include sockets configured to receive specific connectors that are jacks. The individual upstream communication ports may include a plurality of signal paths. These signal paths may include differential signal paths. By way of non-limiting example, the upstream communication ports may include one or more of an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports.

The downstream communication ports may include ports that correspond to the ports of the upstream communication ports. As such, the individual downstream communication ports may include a plurality of signal paths that correspond to the signal paths of the upstream communication ports. If the downstream communication ports correspond to the upstream communication ports, then the types of ports included in the downstream communication ports (e.g., an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports) may be the same as the types of ports included in the upstream communication ports.

The lockbox device may be configured such that each of the relays included therein operate to selectively connect one or more signal paths of one of the upstream communication ports with a corresponding one or more signal paths of a corresponding one of the downstream communication ports. If the relays are closed, then the upstream communication ports are connected with the downstream communication ports such that the individual signal paths of the upstream communication ports are connected with the corresponding individual signal paths of downstream communication ports. If the relays are open, then the connections between the signal paths of the upstream communication ports and the downstream communication ports are broken to disable communication therebetween.

The upstream communication device and the downstream communication device are disposed on opposite sides of the lockbox device, and may be configured to enhance the speed of the system in transmitting information through the lockbox device in response to the relays of the lockbox device transitioning from an open state to a closed state. This may result in faster transmission of the information out of the system than in a system in which the computing platform and/or the router are connected directly to the lockbox device. Although the time savings in communicating the information out of the system may be relatively small (e.g., a millisecond, a few hundred microseconds, and/or other time periods), the time saved by the upstream communication device and/or the downstream communication device may nonetheless provide an advantage. For example, in the context of algorithm-driven securities trading, and/or other contexts these relatively small time periods may have a significant impact. This may provide an enhanced value to a user, an entity associated with the user, and/or customers of the user (and/or associated entity). The user may provide the information to customers directly from the information embargo setting (e.g., directly from the router), and/or indirectly by receiving the information in a communication device (e.g., a server, a separate router, and/or other communication devices) and then transmitting the information to customers.

Generally, the upstream communication device may receive an information payload from the computing platform. To enhance the speed of the system in transmitting information out of the system, the upstream communication device may prepare the information payload for transmission across the lockbox device once the relays of the lockbox device are closed, and/or for eventual transmission out of the system over a network to an external destination. The upstream communication device may store the prepared information payload to electronic storage associated with the upstream communication device. In response to the relays within lockbox device 14 being closed, the upstream communication device may initiate transmission of the stored information payload across the lockbox device. This transmission may be initiated automatically by the upstream communication device. The transmission of the information payload by the upstream communication device may include a plurality of separate serial transmissions across separate signal paths of the upstream communication ports of the lockbox device.

The downstream communication device may generally be configured to receive transmission of the information payload from the upstream communication device through the lockbox device. The downstream communication device may receive the transmission of the information payload via the downstream communication ports. The downstream communication device may process the received information payload in preparation of transmission of the information payload to the router and out of the system. This processing may include, determining a first complete copy of the information payload received from the plurality of serial transmissions sent through the lockbox device by the upstream communication device, reassembling the information payload, error correcting the information payload, and/or other processing. Upon processing the received information payload, the downstream communication device may communicate the information payload to the router to enable the router to transmit the information payload out of the system.

The upstream communication device may include one or more of an upstream communication port, one or more downstream communication ports, electronic storage, one or more processors, and/or other components.

The upstream communication port may be configured to enable communication with the computing platform via the platform port of the computing platform. As such, the upstream communication port may be of a communication port type that is the same as, or corresponds to, the communication port type of the platform port of the computing platform. For example, the upstream communication port may be configured to enable a communication link to be established between the computing platform and the upstream communication device by a cable that extends from a connector that interfaces with the platform port to a connector that interfaces with the upstream communication port. The upstream communication port may be an Ethernet port that enables an Ethernet connection (e.g., a Gigabit Ethernet connection and/or other Ethernet connections) between the computing platform and the upstream communication device.

The downstream communication ports may be configured to enable information to be communicated with the upstream communication device through the lockbox device. As such, the downstream communication ports may have communication port types that are the same as, or correspond to, the communication port types of the upstream communication ports of the lockbox device. For example, a given one of the downstream communication ports may be configured to interface with a connector on a cable that extends from a connector configured to interface with a corresponding one of the upstream communication ports on the lockbox device. The downstream communication ports may each include a plurality of signal paths that correspond to the signal paths included in the upstream communication ports.

By way of non-limiting example, downstream communication ports of the upstream communication device may include one or more of an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports.

The one or more processors of the upstream communication device may be configured to execute one or more modules. The one or more modules may include one or more of an upstream communication module, a payload processing module, a payload queue module, a connection module, a payload transmission module, and/or other modules. The one or more processors may be configured to execute the modules by software; hardware; firmware; some combination of software, hardware, and/or firmware; and/or other mechanisms for configuring processing capabilities on the one or more processors.

The upstream communication module is configured to manage communication between the computing platform and the upstream communication device. Such communication may include status information, results, control commands, information payloads, and/or other information. For example, the upstream communication module may host a socket that accepts messages from the computing platform via TCP.

The payload processing module may be configured to process the information payload received in the processor of the upstream communication device from the computing platform. Once the information is received from the computing platform, the payload processing module may prepare the information payload for transmission out of the information embargo setting to an external destination. This may include formatting the information payload for packet-based transmission (e.g., for communication via TCP/IP, and/or other packet-based protocols). This may include converting the information payload into one or more data packets. The data packets may be complete, as if the information payload were to be transmitted out of the system directly by the upstream communication device. For example, the packets may indicate a transmission destination, such as the MAC address(es) to which the information payload will eventually be transmitted to and/or from.

Once the information payload has been formatted for transmission out of the system, the payload processing module may serialize each byte of the formatted information payload data. For example, the payload processing module may convert each byte of the formatted information payload into the 8b/10b serial format, and/or other formats.

The payload queue module may be configured to manage storage of the processed information payload to the electronic storage of the upstream network module. The processed information payload may be stored in the electronic storage while awaiting transmission from the upstream communication device to the downstream communication device through the lockbox device. As such, the payload queue module and the electronic storage may cooperate to form a buffer for the information payload that holds the processed payload ready for transmission until transmission is made possible by connection of the upstream communication device with the downstream communication device via the lockbox device.

The connection module is configured to determine a status of the connection between the upstream communication device and the downstream communication device formed by the lockbox device. This may include determining whether the relays of the lockbox device are open or closed. By way of non-limiting example, the connection module may monitor the presence or absence of a signal (e.g., a constant HI signal of some predetermined voltage) at one or more of the downstream communication ports. This signal may originate from the downstream communication device. As such, if the relays of the lockbox device are open, the connection module will not detect the signal at the downstream communication ports of the upstream communication device. On the other hand, if the relays of the lockbox device close, the signal will pass through the lockbox device from the downstream communication device to the appropriate one or more downstream communication ports.

In an information embargo setting, as the relays in the lockbox device are switched from open to closed to enable the release of the information payload, the connection module may observe a change in state of the monitored one or more signal paths of the downstream communication ports as the signal transmitted from the downstream communication device is permitted to pass through the lockbox device. Based on this change in the state of the monitored one or more signal paths, the connection module may generate a trigger to one or more of the other modules indicating that the relays of the lockbox device have been closed.

The payload transmission module is configured to transmit the information payload to the downstream communication device through the lockbox device. The payload transmission module may initiate transmission of the information payload based on a determination by the connection module that the relays of the lockbox device have been closed. The payload transmission module may transmit the information payload to the downstream communication device over the signal paths included in the downstream communication ports. The transmission of the information payload by the payload transmission module may include separate, serial transmissions of the information payload over individual ones of the signal paths included in the downstream communication ports. As such, separate, serial transmissions of the information payload may be made by the payload transmission module over two or more of the differential signal paths included in a single one of the downstream communication ports. Further, separate, serial transmissions of the information payload may be made over one or more differential signal paths included in a second one of the downstream communication ports. Still further, separate, serial transmissions of the information payload may be made over one or more differential signal paths included in a third one of the downstream communication ports. In some implementations, all of the available differential signal paths through the lockbox device are used for separate, serial transmissions of the information payload.

As the relays within the lockbox device close, the relays may not all close simultaneously. Instead, various ones of the relays may close slightly before and/or after other ones of the relays. Further, upon closure, the relays may experience bounce. The bounce experienced may not be uniform across all of the relays. As such, one or more of the relays may provide a stable (or at least substantially stable) connection between the upstream communication device and the downstream communication device before and/or after other ones of the relays. Therefore, the multiple separate, serial transmissions of the information payload along separate signal paths (i.e., through separate relays in the lockbox device) may enhance the speed of the information payload to the downstream communication device through the lockbox device with respect to implementations in which a single serial transmission is made.

The serial transmissions of the information payload by the payload transmission module may be made without being proceeded by clock locking, handshaking, and/or other initialization protocols. In other words, immediately (or substantially so) upon receiving a trigger signal from the connection module that the relays within the lockbox device have been closed, the payload transmission module may begin to the separate, serial transmissions of the information payload along the signal paths of the downstream communication ports without first establishing connections with the lockbox device and/or the downstream communication device through the signal paths. The payload transmission module may insert extra idle characters into the transmissions of the information payload. These idle characters may be sacrificed by the downstream communication device to adjust for bit synchronization error, disconnecting relays, or other line noise. The serial transmissions made on the individual signal paths may be repeated by the payload transmission module until a confirmation signal is received by the upstream communication device that the information payload has been received downstream (e.g., at the downstream communication device).

The serial transmissions of the information payload made by the payload transmission module over the individual signal paths of the downstream communication ports may be made by differential line drives included in or controlled by the payload transmission module. The serial transmissions may be made in accordance with a half duplex scheme (e.g., uninterrupted by upstream communication). The serial transmissions may be made without clock rate data and/or other reference data. While this may require additional synchronization, phase detection, and/or error correction downstream, the total transmission and processing time may remain smaller than would be required by first initializing connections along the signal paths and then transmitting the information payload.

The downstream communication device may include one or more of a downstream communication port, one or more upstream communication ports, electronic storage, one or more processors, and/or other components The downstream communication port may be configured to enable communication between the router and the rest of the system. As such, the downstream communication port may be of a communication port type that is the same as, or corresponds to, the communication port type of the router port.

The upstream communication ports may be configured to enable information to be communicated with the downstream communication device through the lockbox device. As such, the upstream communication ports may have communication port types that are the same as, or correspond to, the communication port types of the downstream communication ports of lockbox device. For example, a given one of the upstream communication ports may be configured to interface with a connector on a cable that extends from a connector configured to interface with a corresponding one of upstream communication ports on the lockbox device. The upstream communication ports may each include a plurality of signal paths that correspond to the signal paths included in the downstream communication ports of the lockbox device, which correspond to the signal paths included in the upstream communication ports of the lockbox device, which in turn correspond to the signal paths included in the downstream communication ports of the lockbox device.

By way of non-limiting example, the upstream communication ports of the downstream communication device may include one or more of an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports.

The one or more processors of the downstream communication device may be configured to execute one or more modules. The one or more modules may include one or more of a connection module, a synchronization module, an error correction module, a payload reception module, a payload processing module, a payload transmission module, a status module, and/or other modules. The one or more processors may be configured to execute the modules by software; hardware; firmware; some combination of software, hardware, and/or firmware; and/or other mechanisms for configuring processing capabilities on the one or more processors.

The connection module may be configured to enable a determination within the system of a status of the connection between the upstream communication device and the downstream communication device formed by the lockbox device. This determination may include determining whether the relays of the lockbox device are open or closed. By way of non-limiting example, the connection module may attempt to transmit a signal (e.g., a constant HI signal) to the upstream communication device through the lockbox device. As was discussed above with respect to the connection module of the upstream communication device, this signal may be transmitted by the connection module on one or more of the signal paths included in the upstream communication ports. Based on the reception or lack of reception of this signal at the upstream communication device, the connection module of the upstream communication device may determine whether the relays of the lockbox device are open or closed.

Upon a determination that the relays of the lockbox device have been closed, a plurality of separate, serial transmissions of an information payload are made from the upstream communication device to the downstream communication device through the lockbox device (see, e.g., supra). These separate transmissions may be made without preliminary synching, clock locking, handshaking, and/or other connection initialization between the upstream communication device and the downstream communication device. The separate transmissions may be received by the upstream communication device on individual signal paths of the upstream communication ports that correspond to the signal paths of the downstream communication ports of the downstream communication device on which the transmissions are sent out from the upstream communication device through the lockbox device.

The synchronization module may be configured to oversample the incoming serial transmissions of the information payload, and to determine phase synchronization and/or timing for the incoming transmissions. For example, for a given serial transmission received on a given signal path of one of the upstream communication ports of the downstream communication device, the synchronization module may apply a plurality of oversampling phases to the incoming transmission. The synchronization module may then analyze the applications of the various oversampling phases to determine which of the oversampling phases should be used to reassemble the information payload from the transmission. To account for some level of mismatch in frequency between the clocks of upstream communication device 18 and downstream communication device 20, synchronization module 58 may drop or add idle characters to or from the incoming transmissions as part of the synchronization process.

The error correction module may be configured to correct errors in the received transmissions of the information payload. These errors may include errors caused by bounce in the relays of the lockbox device, errors caused by cross-talk, interference, and/or other errors and/or noise introduced to the transmitted signal between the upstream communication device and the downstream communication device.

The payload reception module may be configured to receive the transmissions of the information payload after synching and error detection. The payload reception module may receive the separate transmissions of the information payload, and may determine when one of the transmissions has provided a copy of the information payload suitable for transmission out of the system. To make this determination, the payload reception module may monitor the incoming transmissions of the information payload in an ongoing manner. For example, checksums may be performed on the incoming transmissions until one of the transmissions is verified by the checksum.

The payload processing module may be configured to process the copy of the information payload identified by the payload reception module as being the first copy of the information payload suitable for transmission out of the system. The payload processing module may process the received copy of the information payload to enable the information payload to be transmitted out of the system by the router. For example, the payload processing module may reformat the copy of the information payload to de-serialize the information. In implementations in which the information was formatted to a packet-based format before being serialized, this conversion may place the information payload in condition for non-serial transmission (e.g., a packet-based transmission) without the need for additional processing (e.g., converting to packets, providing transmission MAC address(es), and/or other processing).

The payload transmission module may be configured to transmit the information payload from the downstream communication device to the router. For example, the payload transmission module may transmit the information payload from the downstream communication device to the router via a packet-based communication protocol, such as TCP/IP or other packet-based communications protocols. This transmission may be initiated as soon as any data from the information payload has been de-serialized. This may result in some of the data from the information payload being transmitted even as other data is still being de-serialized.

It will be appreciated that the description of the separate preliminary processing of the individual serial transmissions received from the upstream communication device prior to the determination of the payload reception module may include more or less processing. For example, the payload reception module may determine a first complete copy of the information payload has been received before the error correction module performs error detection, and the error correction module may only process the first complete copy of the information payload. As another example, the payload processing module may be processing the individual transmissions of the information payload in an ongoing manner prior to a determination by the payload reception module that a first complete copy of the information payload has been received. This may reduce the processing that must be performed on the information payload between determination of the first complete copy of the information payload by the payload reception module and the transmission of the information payload by the payload transmission module to the router. Other examples of the order in which processing may be performed are also contemplated, and will be apparent from the foregoing description.

The status module may be configured to monitor the status of operation of the system. The status module may be configured to generate status notifications to one or more of the other components of the system indicating operating status. For example, in response to a determination by the payload reception module that a complete copy of an information payload has been received through the lockbox device, the status module may generate a message to the upstream communication device indicating that the information payload has been received. As another example, the status module may wait until receiving a message from an external destination of the information payload that the information payload has been received before generating the message to the upstream communication device. A message to the upstream communication device from the status module may be implemented within the upstream communication device to trigger the beginning and/or end of one or more processes. For instance, the upstream communication device may stop the transmissions of the information payload in response to reception of such a message. The upstream communication device may be configured to further provide the messages from the status module to the computing platform so that the user is notified that transmission through the lockbox device and/or out of the system has been successful.

It will be appreciated that the description of the upstream communication device and the downstream communication device as standalone devices is not intended to be limiting. For example, some or all of the functionality attributed herein to the upstream communication device may be included within the computing platform, and/or some or all of the functionality attributed herein to the downstream communication device may be included within the router.

In some implementations, functionality attributed herein to the upstream communication device and the downstream communication device is provided by devices that are interchangeable (e.g., capable of functioning as either the upstream communication device or the downstream communication device). To enable this capability, the devices may include the hardware, software, and/or firmware suitable for performance of the functionality of the upstream communication device and the downstream communication device.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
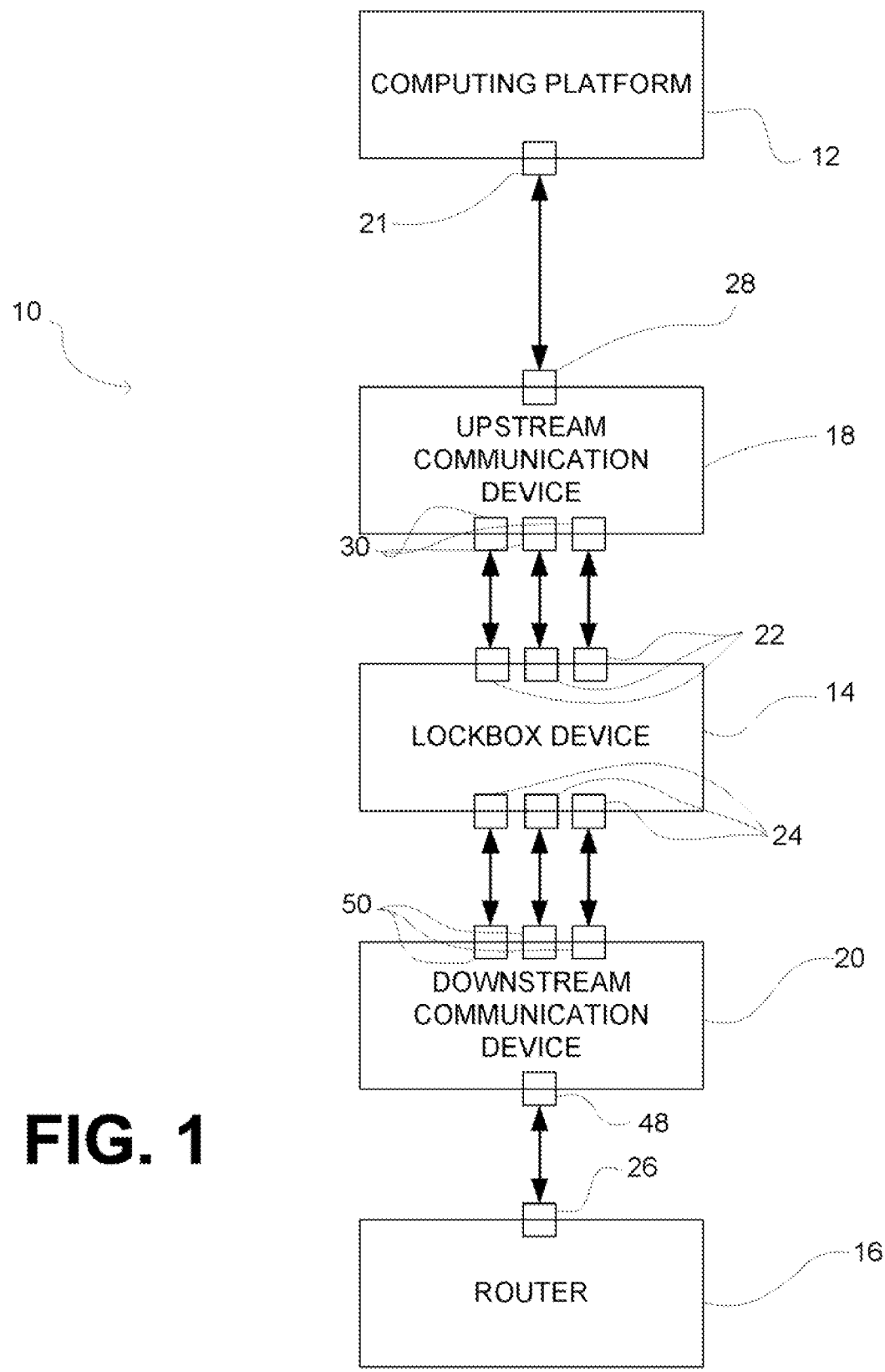
FIG. 1 illustrates a system configured to electronically transmit information being released from an information embargo setting, in accordance with one or more embodiments of the invention.

FIG. 1 illustrates a system 10 configured to electronically transmit information being released from an information embargo setting (e.g., as described supra). One or more of the components of system 10 may be configured to reduce latency and/or lag in releasing information, and/or to enhance the speed with which information is electronically transmitted through a lockbox device 14 associated with an entity releasing the embargoed information. This may enable a user implementing system 10 to disseminate information from the information embargo setting faster than other entities that have received the information in the information embargo setting. In some implementations, system 10 may include one or more of a computing platform 12, a router 16, an upstream communication device 18, a downstream communication device 20, and/or other components.

The computing platform 12 is configured to process information in accordance with a set of instructions. The computing platform 12 may enable a user to input information, such as the information received by the user in the information embargo setting. The user may input the information to computing platform 12 via manual input (e.g., by typing a release or story), via electronic information transfer (e.g., download), and/or by other techniques for inputting information to a computing platform. As such, computing platform 12 may provide the user with a user interface to system 10. Via this interface, the user may input the information received by the user in the information embargo setting, control one or more other components of system 10, receive feedback and/or status information related to one or more other components of system 10, and/or otherwise interact with system 10. Information is communicated to and from computing platform 12 by a platform port 21. In one embodiment, platform port 21 is an Ethernet port. By way of non-limiting example, computing platform 12 may include one or more of a desktop computer, a laptop computer, a handheld computer, a NetBook, a personal digital assistant, a smart phone, a workstation (e.g., a journalist workstation) and/or other computing platforms.

The lockbox device 14 is configured to selectively connect and disconnect computing platform 12 with router 16. The lockbox device 14 may form an airgap firewall between computing platform 12 and router 16 that selectively isolates computing platform 12 from router 16. The lockbox device 14 may include one or more relays that are controllable to connect and/or disconnect signal paths between computing platform 12 and router 16 (and/or the components connected between lockbox device 14 and computing platform 12 or router 16). If power in lockbox device 14 is low, the one or more relays may be open, thereby disconnecting the signal paths. When power in lockbox device 14 goes high, the one or more relays may close, thereby connecting the signal paths to enable the transmission of information between computing platform 12 and router 16.

The lockbox device 14 may be associated with an entity managing the release of information in the information embargo setting. By way of non-limiting example, lockbox device 14 may be associated with, provided by, and/or controlled by a governmental agency, a news organization, and/or other entities that manage the release of information in an information embargo setting. As such, the construction and/or operation of lockbox device 14 may be imposed on the user or entity implementing system 10 to release information from the information embargo setting. During operation in an information embargo setting, control over lockbox device 14 to selectively open or close the relays may be exercised by the entity controlling the release of information.

Although lockbox devices of various configurations may be used, in the implementations illustrated in FIG. 1, lockbox device 14 includes a plurality of upstream communication ports 22, and a plurality of downstream communication ports 24. Upstream communication ports 22 may be configured to communicate information between lockbox device 14 and components of system 10 that are located upstream from lockbox device 14. Downstream communication ports 24 may be configured to communicate information between lockbox device 14 and components of system 10 that are located downstream from lockbox device 14.

The upstream communication ports 22 may include a number of different types of ports configured to receive corresponding connectors. The upstream communication ports 22 may include sockets configured to receive specific connectors that are jacks. The individual upstream communication ports 22 may include a plurality of signal paths. These signal paths may include differential signal paths. By way of non-limiting example, upstream communication ports 22 may include one or more of an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports.

The downstream communication ports 24 may include ports that correspond to the ports of upstream communication ports 22. As such, the individual downstream communication ports 24 may include a plurality of signal paths that correspond to the signal paths of upstream communication ports 22. If the downstream communication ports 24 correspond to upstream communication ports 22, then the types of ports included in downstream communication ports 24 (e.g., an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports) may be the same as the types of ports included in upstream communication ports 22.

The lockbox device 14 may be configured such that each of the relays included therein operate to selectively connect one or more signal paths of one of upstream communication ports 22 with a corresponding one or more signal paths of a corresponding one of downstream communication ports 24. If the relays are closed, then the upstream communication ports 22 are connected with downstream communication ports 24 such that the individual signal paths of the upstream communication ports 22 are connected with the corresponding individual signal paths of downstream communication ports 24. If the relays are open, then the connections between the signal paths of upstream communication ports 22 and downstream communication ports 24 are broken to disable communication therebetween.

The router 16 is configured to enable external communication to and from system 10. For example, router 16 may communicate with one or more servers, or other electronic components, over a long haul circuit. For instance, router 16 may enable communication to and from system 10 via the Internet, other Wide Area Networks, discrete electronic connection with a computing platform located remote from system 10, and/or other information recipients and/or information sources. It will be appreciated that the description of component 16 as a router is merely used illustratively to describe a component that enables information to be passed to and from system 10. In some implementations, router 16 may include a switch, a gateway, a hub, and/or other networking or communications components other than a router. These components may be included in router 16 with or without an actual conventional router. The router 16 may include a router port 26. The router port 26 may be configured to communicate information between router 16 and the rest of system 10. For example, router port 26 may include an Ethernet port, and/or other communication ports.

The upstream communication device 18 and downstream communication device 20 are disposed on opposite sides of lockbox device 14, and may be configured to enhance the speed of system 10 in transmitting information out from system 10 in response to the relays of lockbox device 14 transitioning from an open state to a closed state. This may enable the user of system 10 to communicate information received in the information embargo setting out of system 10 faster than other individuals and/or entities that have received the information in the information embargo setting. Although the difference in time required for communication may be relatively small (e.g., a millisecond, a few hundred microseconds, and/or other time periods), the time saved by upstream communication device 18 and/or downstream communication device 20 may provide an advantage. For example, in the context of algorithm-driven securities trading, and/or other contexts these relatively small time periods may have a significant impact.

Upstream communication device 18 may receive an information payload from computing platform 12. The upstream communication device 18 may prepare the information payload for transmission across lockbox device 14, and/or for eventual transmission out of system 10 to an external destination (e.g., over an external network). The upstream communication device 18 may store the prepared information payload to electronic storage associated with upstream communication device 18. In response to the relays within lockbox device 14 being closed, upstream communication device 18 may initiate transmission of the information payload across lockbox device 14. This transmission may be initiated automatically by upstream communication device 18. The transmission of the information payload by upstream communication device 18 may include a plurality of separate serial transmissions across separate signal paths of upstream communication ports 22.

The downstream communication device 20 may generally be configured to receive transmission of the information payload from upstream communication device 18 through lockbox device 14. The downstream communication device 20 may receive the transmission of the information payload via downstream communication ports 24. The downstream communication device 20 may convert the information payload for transmission out of system 10. The information payload may be communicated from downstream communication device 20 to router 16 via router port 26 to enable router 16 to transmit the information payload out of system 10.

Figure 2:
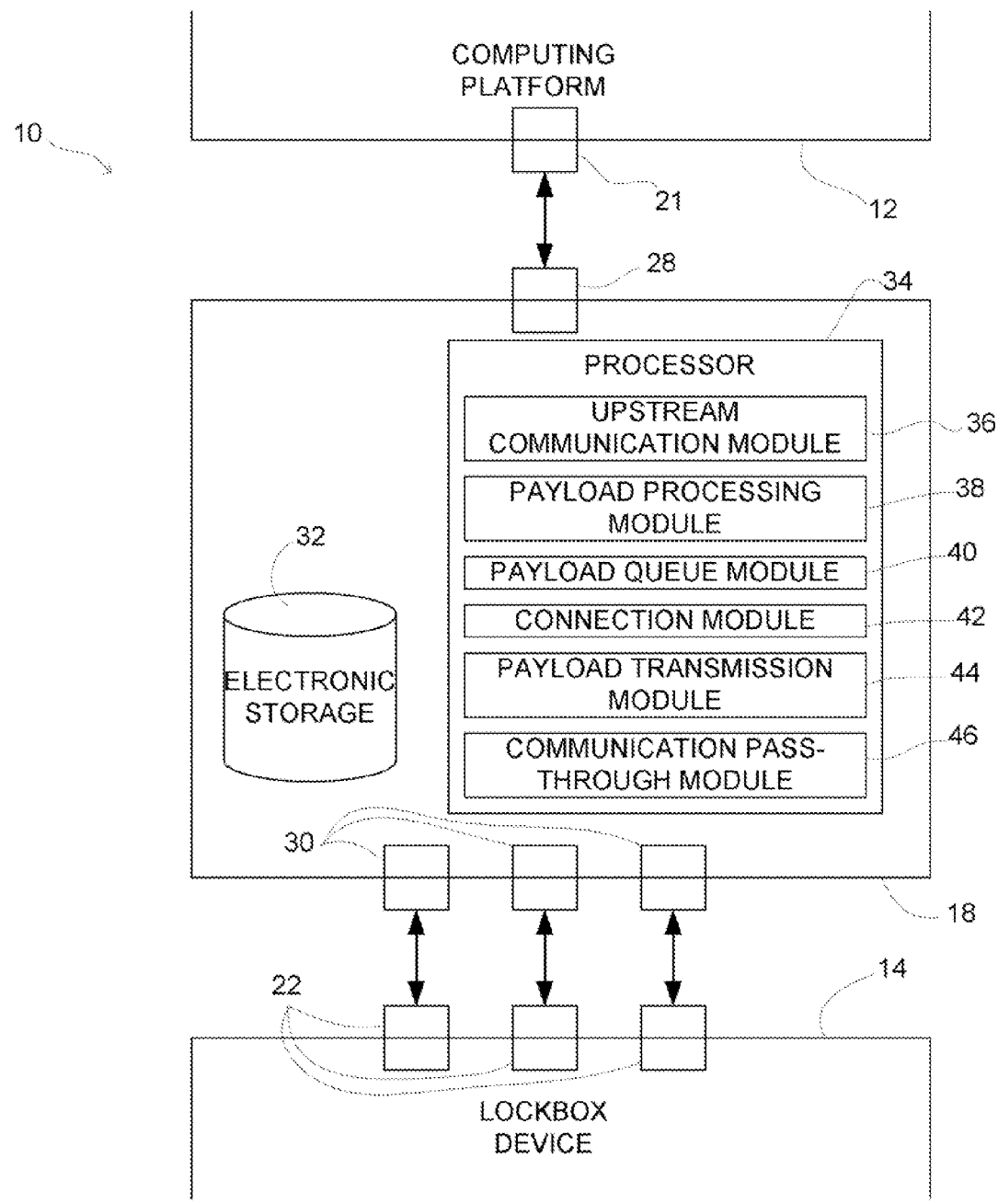
FIG. 2 illustrates an upstream communication device, according to one or more embodiments of the invention.

FIG. 2 illustrates upstream communication device 18, in accordance with one or more implementations. As can be seen in FIG. 2, upstream communication device 18 may include one or more of an upstream communication port 28, one or more downstream communication ports 30, electronic storage 32, one or more processors 34, and/or other components. The upstream communication device 18 may include an internal power supply (e.g., a battery, a capacitor, and/or other power supplies), and/or may be powered by an external power supply (e.g., a wall socket, a generator, and/or other power supplies).

The upstream communication port 28 may be configured to enable communication with computing platform 12 via platform port 21. As such, upstream communication port 28 may be of a communication port type that is the same as, or corresponds to, the communication port type of platform port 21. For example, upstream communication port 28 may be configured to enable a communication link to be established between computing platform 12 and upstream communication device 18 by a cable that extends from a connector that interfaces with platform port 21 to a connector that interfaces with upstream communication port 28. The upstream communication port 28 may be an Ethernet port that enables an Ethernet connection (e.g., a Gigabit Ethernet connection and/ or other Ethernet connections) between computing platform 12 and upstream communication device 18.

The downstream communication ports 30 may be configured to enable information to be communicated with upstream communication device 18 through lockbox device 14. As such, the downstream communication ports 30 may have communication port types that are the same as, or correspond to, the communication port types of upstream communication ports 22 of lockbox device 14. For example, a given one of downstream communication ports 30 may be configured to interface with a connector on a cable that extends from a connector configured to interface with a corresponding one of upstream communication ports 22 on lockbox device 14. The downstream communication ports 30 may each include a plurality of signal paths that correspond to the signal paths included in upstream communication ports 22.

As was mentioned above, the signal paths included in upstream communication ports 22 may include differential signal paths. The same may be the case with the signal paths included in downstream communication ports 30. During use, twisted pairs carried by a cable that interfaces with a given one of upstream communication ports 22 and a corresponding given one of downstream communication ports 30 may place the corresponding signal paths of the given upstream communication port 22 and the given downstream communication port 30 in communication. By way of non-limiting example, downstream communication ports 30 of upstream communication device 18 may include one or more of an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports.

The electronic storage 32 may comprise electronic storage media that electronically stores information. The electronic storage media of electronic storage 32 may include one or both of system storage that is provided integrally (i.e., substantially non-removable) with upstream communication device 18 and/or removable storage that is removably connectable to upstream communication device 18 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may store software algorithms, information determined by processor 34, information received from computing platform 12, and/or other information that enables upstream communication device 18 to function properly. Electronic storage 32 may be a separate component from upstream communication device 18, or electronic storage 32 may be provided integrally with upstream communication device 18.

Processor 34 is configured to provide information processing capabilities in upstream communication device 18. As such, processor 34 may include one or more of a digital processor, an analog processor, a digital circuit designed to process information, an analog circuit designed to process information, a state machine, and/or other mechanisms for electronically processing information. Although processor 34 is shown in FIG. 2 as a single entity, this is for illustrative purposes only. In some implementations, processor 34 may include a plurality of processing units. These processing units may be physically located within the same device, or processor 34 may represent processing functionality of a plurality of devices operating in coordination. For example, processor 34 may include a microprocessor (e.g., a processor having P6 microarchitecture) and/or one or more Field-Programmable Gate Arrays ("FPGA") configured to perform the functionality attributed to processor 34 herein.

As is shown in FIG. 2, processor 34 may be configured to execute one or more modules. The one or more modules may include one or more of an upstream communication module 36, a payload processing module 38, a payload queue module 40, a connection module 42, a payload transmission module 44, a communication pass-through module 46, and/or other modules. Processor 34 may be configured to execute modules 36, 38, 40, 42, 44, and/or 46 by software; hardware; firmware; some combination of software, hardware, and/or firmware; and/or other mechanisms for configuring processing capabilities on processor 34.

It should be appreciated that although modules 36, 38, 40, 42, 44, and 46 are illustrated in FIG. 2 as being co-located within a single processing unit, in implementations in which processor 34 includes multiple processing units, one or more of modules 36, 38, 40, 42, 44, and/or 46 may be located remotely from the other modules. The description of the functionality provided by the different modules 36, 38, 40, 42, 44, and/or 46 described below is for illustrative purposes, and is not intended to be limiting, as any of modules 36, 38, 40, 42, 44, and/or 46 may provide more or less functionality than is described. For example, one or more of modules 36, 38, 40, 42, 44, and/or 46 may be eliminated, and some or all of its functionality may be provided by other ones of modules 36, 38, 40, 42, 44, and/or 46. As another example, processor 34 may be configured to execute one or more additional modules that may perform some or all of the functionality attributed below to one of modules 36, 38, 40, 42, 44, and/or 46.

The upstream communication module 36 is configured to manage communication between computing platform 12 and upstream communication device 18. Such communication may include status information, results, control commands, information payloads, and/or other information. Such communication may pass back and/or forth between computing platform 12 and upstream communication device 18 via platform port 21 and upstream communication port 28. The upstream communication module 36 may host a socket that accepts messages from computing platform 12 via TCP.

As was mentioned above, communication received by upstream communication module 36 from computing platform 12 may include an information payload. As used herein, the "information payload" may include information to be communicated out of system 10 at the end of an information embargo. The information payload may include raw data obtained by the user of system 10 from an information providing entity, an article containing the information received by the user of system 10 from the information providing entity, information received by the user of system 10 that has been formatted by the user and/or computing platform 12, and/or other information.

The payload processing module 38 may be configured to process the information payload received in processor 34 from computing platform 12. Once the information is received from computing platform 12, payload processing module 38 may prepare the information payload for transmission out of the information embargo setting to an external destination. This may include formatting the information payload for packet-based transmission (e.g., for communication via TCP/IP, and/or other packet-based protocols). This may include converting the information payload into one or more data packets, the data packets may be complete, as if the information payload were to be transmitted out of system 10 directly by upstream communication device 18. For example, the packets may indicate a transmission destination, such as the MAC address(es) to which the information payload will eventually be transmitted to and/or from.

Once the information payload has been formatted for transmission out of system 10, payload processing module 38 may serialize each byte of the formatted payload data. For example, payload processing module 38 may convert each byte of the formatted information payload into 8b/10b serial format, and/or other formats.

The payload queue module 40 may be configured to manage storage of the processed information payload to electronic storage 32. The processed information payload may be stored in electronic storage 32 while awaiting transmission from upstream communication device 18 to downstream communication device 20 through lockbox device 14. As such, payload queue module 40 and electronic storage 32 may cooperate to form a buffer for the information payload that holds the processed payload ready for transmission until transmission is made possible by connection of upstream communication device 18 with downstream communication device 20 via lockbox device 14.

The connection module 42 is configured to determine a status of the connection between upstream communication device 18 and downstream communication device 20 formed by lockbox device 14. This may include determining whether the relays of lockbox device 14 are open or closed. By way of non-limiting example, connection module 42 monitor the presence or absence of a signal (e.g., a constant HI signal of some predetermined voltage) at one or more of downstream communication ports 30. This signal may originate from downstream communication device 20. As such, if the relays of lockbox device 14 are open, connection module 42 will not detect the signal at downstream communication ports 30. On the other hand, if the relays of lockbox device 14 close, the signal will pass through lockbox device 14 from downstream communication device 20 to the appropriate one or more downstream communication ports 30.

In some implementations, the signal indicating whether the relays of lockbox device 14 are open or closed may be received at upstream communication device 18 on a specific one or more signal paths formed by one or more of downstream communication ports 30. For example, one of downstream communication ports 30 may include a signal path that is not paired with another signal path to form a differential signal path (e.g., the "un-paired" pin on an RS-232 port (Pin 1), and/or other un-paired signal paths). The signal indicating whether the relays of lockbox device 14 are open or closed may be received at upstream communication device 18 on this un-paired signal path.

In an information embargo setting, as the relays in lockbox device 14 are switched from open to closed to enable the release of the information payload, connection module 42 may observe a change in state of the monitored one or more signal paths as the signal transmitted from downstream communication device 20 to one or more of downstream communication ports 30 is suddenly transmitted through lockbox device 14. Based on this change in the state of the monitored one or more signal paths, connection module 42 may generate a trigger to one or more of modules 36, 38, 40, 44, and/or 48 indicating that the relays of lockbox device 14 have been closed.

The payload transmission module 44 is configured to transmit the information payload to downstream communication device 20 through lockbox device 14. The payload transmission module 44 may initiate transmission of the information payload based on a determination by connection module 42 that the relays of lockbox device 14 have been closed. The payload transmission module 44 may transmit the information payload to downstream communication device 20 over the signal paths included in downstream communication ports 30. The transmission of the information payload by payload transmission module 44 may include separate, serial transmissions of the information payload over individual ones of the signal paths included in downstream communication ports 30. As such, separate, serial transmissions of the information payload may be made by payload transmission module 44 over two or more of the differential signal paths included in a single one of downstream communication ports 30. Further, separate, serial transmissions of the information payload may be made over one or more differential signal paths included in a second one of downstream communication ports 30. Still further, separate, serial transmissions of the information payload may be made over one or more differential signal paths included in a third one of downstream communication ports 30. In some implementations, all of the available differential signal paths through lockbox device 14 may be used for separate, serial transmissions of the information payload.

As the relays within lockbox device 14 close, the relays may not all close simultaneously. Instead, various ones of the relays may close slightly before and/or after other ones of the relays. Further, upon closure, the relays may experience bounce. The bounce experienced may not be uniform across all of the relays. As such, one or more of the relays may provide a stable (or at least substantially stable) connection between upstream communication device 18 and downstream communication device 20 before and/or after other ones of the relays. Therefore, the multiple separate, serial transmissions of the information payload along separate signal paths (through separate relays in lockbox device 14) may enhance the speed of the information payload to downstream communication device 20 through lockbox device 14.

The serial transmissions of the information payload by payload transmission module 44 may be made without being proceeded by handshaking protocols. In other words, immediately (or substantially so) upon receiving a trigger signal from connection module 42 that the relays within lockbox device 14 have been closed, payload transmission module 44 may begin the separate, serial transmissions of the information payload along the signal paths of downstream communication ports 30 without first establishing connections with lockbox device 14 and/or downstream communication device 20 through the signal paths. The payload transmission module 44 may insert extra idle characters into the transmissions of the information payload. These idle characters may be sacrificed by downstream communication device 20 to adjust for line noise and/or frequency mismatch between the clock used by payload transmission module 44 to transmit the information payload and the clock used by downstream communication device 20 to receive the information payload. The serial transmissions made on the individual signal paths may be repeated by payload transmission module 44 until a confirmation signal is received by upstream communication device 18 that the information payload has been received downstream.

The serial transmissions of the information payload made by payload transmission module 44 over the individual signal paths of downstream communication ports 30 may be made by differential line drives included in or controlled by payload transmission module 44. The serial transmissions may be made in accordance with a half duplex scheme (e.g., uninterrupted by upstream communication). The serial transmissions may be made without clock rate data and/or other reference data. While this may require additional synchronization, phase detection, and/or error correction downstream, the total transmission and processing time may remain smaller than would be required by first initializing connections along the signal paths and then transmitting the information payload.

The communication pass-through module 46 may be configured to pass-through communications between computing platform 12 and other entities external to system 10. By way of non-limiting example, computing platform 12 may communicate with one or more entities (e.g., server(s)) over a network through router 16. Such communication may be transmitted to and from computing platform 12 according to packet-based communication protocol(s), such as TCP/IP, for example. The communication pass-through module 46 may be configured to ensure that when the relays of lockbox device 14 are open (thereby disconnecting computing platform 12 from entities external to system 10), one or more computer program modules being executed on computing platform 12 do not trigger an error. By way of non-limiting example, an operating system of computing platform 12 may be configured to trigger a disconnect error or event if computing platform 12 is disconnected from a network. The communication pass-through module 46 may be configured to communicate with computing platform 12 to avoid triggering such an error or event.

Figure 3:
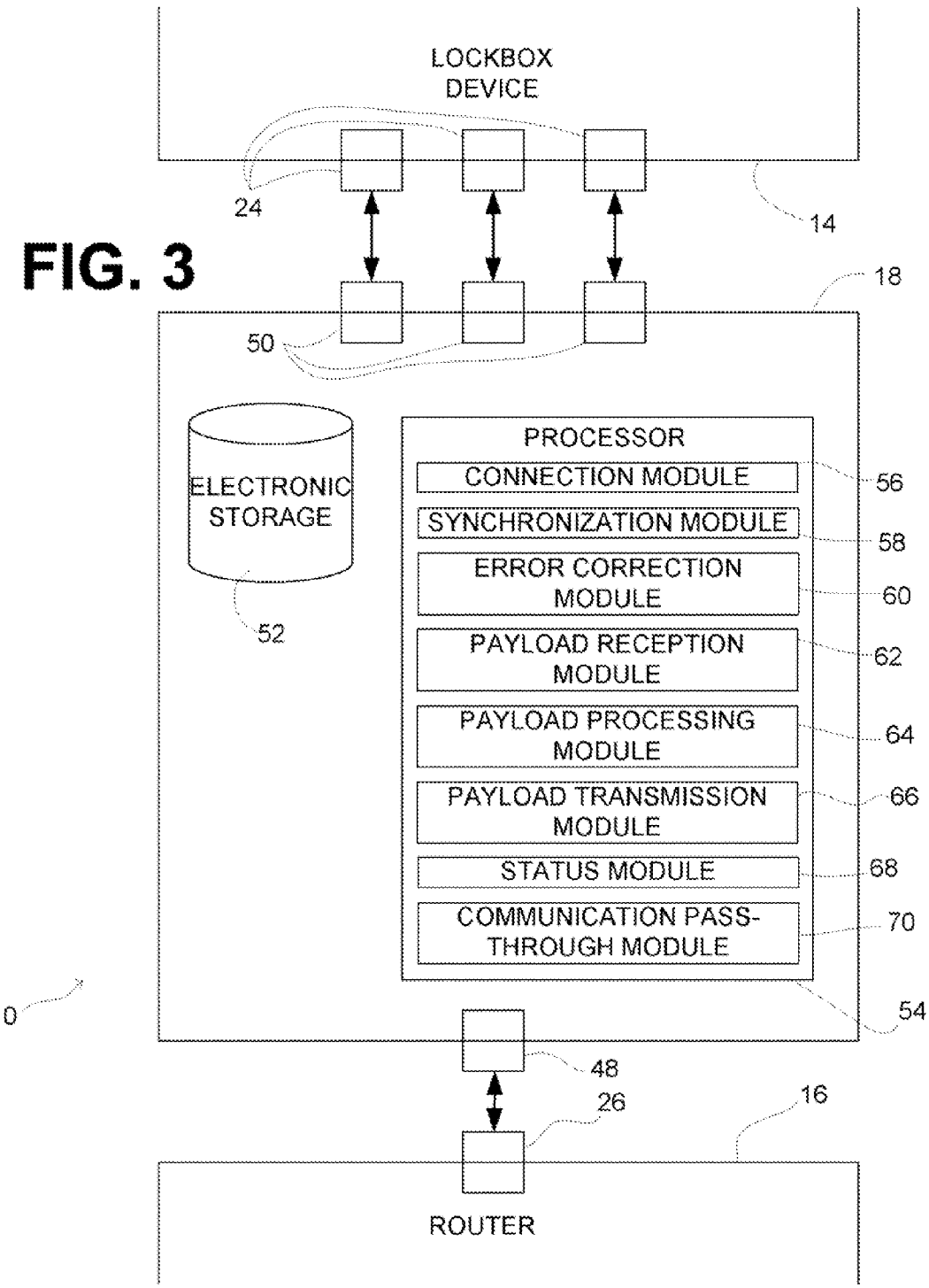
FIG. 3 illustrates a downstream communication device, in accordance with one or more embodiments of the invention.

FIG. 3 illustrates downstream communication device 20, in accordance with one or more implementations. As can be seen in FIG. 3, downstream communication device 20 may include one or more of a downstream communication port 48, one or more upstream communication ports 50, electronic storage 52, one or more processors 54, and/or other components. The upstream communication device 18 may include an internal power supply (e.g., a battery, a capacitor, and/or other power supplies), and/or may be powered by an external power supply (e.g., a wall socket, a generator, and/or other power supplies).

The downstream communication port 48 may be configured to enable communication between router 16 and the rest of system 10 via router port 26. As such, downstream communication port 48 may be of a communication port type that is the same as, or corresponds to, the communication port type of router port 26. For example, downstream communication port 48 may be configured to enable a communication link to be established between router 16 and downstream communication device 20 by a cable that extends from a connector that interfaces with router port 26 to a connector that interfaces with downstream communication port 48. The downstream communication port 48 may be an Ethernet port that enables an Ethernet connection (e.g., a Gigabit Ethernet connection and/or other Ethernet connections) between router 16 and downstream communication device 20.

The upstream communication ports 50 may be configured to enable information to be communicated with downstream communication device 20 through lockbox device 14. As such, the upstream communication ports 50 may have communication port types that are the same as, or correspond to, the communication port types of downstream communication ports 24 of lockbox device 14. For example, a given one of upstream communication ports 50 may be configured to interface with a connector on a cable that extends from a connector configured to interlace with a corresponding one of electronic storage 52 on lockbox device 14. The upstream communication ports 50 may each include a plurality of signal paths that correspond to the signal paths included in downstream communication ports 24.

The signal paths included in downstream communication ports 24 may include differential signal paths (e.g., as discussed supra). The same may be the case with the signal paths included in upstream communication ports 50. During use, twisted pairs carried by a cable that interfaces with a given one of downstream communication ports 24 and a corresponding given one of upstream communication ports 50 may place the corresponding signal paths of the given downstream communication ports 24 and the given upstream communication port 50 in communication. By way of non-limiting example, upstream communication ports 50 of downstream communication device 20 may include one or more of an 8-position-8-contact port (e.g., a registered jack 45 (RJ45) port), a registered jack 12 (RJ12) port, a registered jack 11 (RJ11) port, a registered jack 14 (RJ14) port, a registered jack 25 (RJ25) port, a DB-25 port, an RS-232 port, and/or other ports.

The electronic storage 52 may comprise electronic storage media that electronically stores information. The electronically storage media of electronic storage 52 may include one or both of system storage that is provided integrally (i.e., substantially non-removable) with downstream communication device 20 and/or removable storage that is removably connectable to downstream communication device 20 via, for example, a port (e.g., a USB port, a firewire port, etc.) or a drive (e.g., a disk drive, etc.). Electronic storage 52 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 52 may store software algorithms, information determined by processor 54, and/or other information that enables downstream communication device 20 to function properly. Electronic storage 52 may be a separate component from downstream communication device 20, or electronic storage 52 may be provided integrally with downstream communication device 20.

Processor 54 is configured to provide information processing capabilities in downstream communication device 20. As such, processor 54 may include one or more of a digital processor, an analog processor, a digital circuit designed to process information, an analog circuit designed to process information, a state machine, and/or other mechanisms for electronically processing information. Although processor 54 is shown in FIG. 3 as a single entity, this is for illustrative purposes only. In some implementations, processor 54 may include a plurality of processing units. These processing units may be physically located within the same device, or processor 54 may represent processing functionality of a plurality of devices operating in coordination. For example, processor 54 may include a microprocessor (e.g., a processor having P6 microarchitecture) and/or one or more Field-Programmable Gate Arrays ("FPGA") configured to perform the functionality attributed to processor 54 herein.

As is shown in FIG. 3, processor 54 may be configured to execute one or more modules. The one or more modules may include one or more of a connection module 56, a synchronization module 58, an error correction module 60, a payload reception module 62, a payload processing module 64, a payload transmission module 66, a status module 68, a communication pass-through module 70, and/or other modules. Processor 54 may be configured to execute modules 56, 58, 60, 62, 64, 66, 68, and/or 70 by software; hardware; firmware;

some combination of software, hardware, and/or firmware; and/or other mechanisms for configuring processing capabilities on processor 54.

It should be appreciated that although modules 56, 58, 60, 62, 64, 66, 68, and 70 are illustrated in FIG. 3 as being co-located within a single processing unit, in implementations in which processor 54 includes multiple processing units, one or more of modules 56, 58, 60, 62, 64, 66, 68, and/or 70 may be located remotely from the other modules. The description of the functionality provided by the different modules 56, 58, 60, 62, 64, 66, 68, and/or 70 described below is for illustrative purposes, and is not intended to be limiting, as any of modules 56, 58, 60, 62, 64, 66, 68, and/or 70 may provide more or less functionality than is described. For example, one or more of modules 56, 58, 60, 62, 64, 66, 68, and/or 70 may be eliminated, and some or all of its functionality may be provided by other ones of modules 56, 58, 60, 62, 64, 66, 68, and/or 70. As another example, processor 54 may be configured to execute one or more additional modules that may perform some or all of the functionality attributed below to one of modules 56, 58, 60, 62, 64, 66, 68, and/or 70.

The connection module 56 is configured to enable a determination within system 10 of a status of the connection between upstream communication device 18 and downstream communication device 20 formed by lockbox device 14. This determination may include determining whether the relays of lockbox device 14 are open or closed. By way of non-limiting example, connection module 56 may attempt to transmit a signal (e.g., a constant HI signal) to upstream communication device 18 through lockbox device 14. As was discussed above with respect to connection module 42 of upstream communication device 18, this signal may be transmitted by connection module 56 on one or more of the signal paths included in upstream communication ports 50. Based on the reception or lack of reception of this signal at upstream communication device 18, connection module 42 of upstream communication device 18 may determine whether the relays of lockbox device 14 are open or closed.

Upon a determination that the relays of lockbox device 14 have been closed, a plurality of separate, serial transmissions of an information payload are made from upstream communication device 18 to downstream communication device 20 through lockbox device 14 (see supra). These separate transmissions may be made without preliminary synching and/or handshaking between upstream communication device 18 and downstream communication device 20. The separate transmissions may be received by upstream communication device 18 on individual signal paths of upstream communication ports 50 that correspond to the signal paths of downstream communication ports 30 on which the transmissions are sent out from upstream communication device 18.

The synchronization module 58 may be configured to oversample the incoming serial transmissions of the information payload, and to determine phase synchronization and/or timing for the incoming transmissions. For example, for a given serial transmission received on a given signal path of one of upstream communication ports 50, synchronization module 58 may apply a plurality of oversampling phases to the incoming transmission. The synchronization module 58 may then analyze the applications of the various oversampling phases to determine which of the oversampling phases should be used to reassemble the information payload from the transmission. To account for some level of mismatch in frequency between the clocks of upstream communication device 18 and downstream communication device 20, synchronization module 58 may drop or add idle characters to or from the incoming transmissions as part of the synchronization process.

The error correction module 60 may be configured to correct errors in the received transmissions of the information payload. These errors may include errors caused by bounce in the relays of lockbox device 14, errors caused by cross-talk, interference, and/or other errors and/or noise introduced to the transmitted signal between upstream communication device 18 and downstream communication device 20.

The payload reception module 62 may be configured to receive the transmissions of the information payload after synching and error detection. The payload reception module 62 may receive the separate transmissions of the information payload, and may determine when one of the transmissions has provided a copy of the information payload suitable for transmission out of system 10. To make this determination, payload reception module 62 may monitor the incoming transmissions of the information payload in an ongoing manner. For example, checksums may be performed on the incoming transmissions until one of the transmissions is verified by the checksum.

The payload processing module 64 may be configured to process the copy of the information payload identified by payload reception module 62 as being suitable for transmission out of system 10. The payload processing module 64 may process the received copy of the information payload to enable the information payload to be transmitted out of system 10 by router 16. For example, payload processing module 64 may reformat the copy of the information payload to de-serialize the information. In implementations in which the information was formatted to a packet-based format before being serialized, this conversion may place the information payload in condition for non-serial transmission (e.g., a packet-based transmission) without the need for additional processing (e.g., converting to packets, providing MAC address(es), and/or other processing).

The payload transmission module 66 may be configured to transmit the information payload from downstream communication device 20 to router 16. For example, payload transmission module 66 may transmit the information payload from downstream communication device 20 to router 16 via a packet-based communication protocol, such as TCP/IP or other packet-based communications protocols. This transmission may be initiated as soon as any packet of data from the information payload has been de-serialized. This may result in some of the data from the information payload being transmitted even as other data is still being de-serialized.

It will be appreciated that the description of the separate preliminary processing of the individual serial transmissions received from upstream communication device 18 prior to determination of payload reception module 62 may include more or less processing. For example, payload reception module 62 may determine a first complete copy of the information payload has been received before error correction module 60 performs error detection, and error correction module 60 may only process the first complete copy of the information payload. As another example, payload processing module 64 may be processing the individual transmissions of the information payload in an ongoing manner prior to a determination by payload reception module 62 that a first complete copy of the information payload has been received. This may reduce the processing that must be performed on the information payload between determination of the first complete copy of the information payload by payload reception module 62 and the transmission of the information payload by payload transmission module 66 to router 16. Other examples of the order in which processing may be performed are also contemplated, and will be apparent from the foregoing description.

The status module 68 may be configured to monitor the status of operation of system 10. The status module 68 may be configured to generate status notifications to one or more of the other components of system 10 indicating operating status. For example, in response to a determination by payload reception module 62 that a complete copy of an information payload has been received through lockbox device 14, status module 68 may generate a message to upstream communication device 18 indicating that the information payload has been received. As another example, status module 68 may wait until receiving a message from an external destination of the information payload that the information payload has been received before generating a message to upstream communication device 18. A message to upstream communication device 18 from status module 68 may be implemented within upstream communication device 18 to trigger the beginning and/or end of one or more processes. For instance, upstream communication device 18 may stop the transmissions of the information payload in response to reception of such a message. The upstream communication device 18 may be configured to further provide the message from status module 68 (or a message based on the status module's 68 message) to computing platform 12 so that the user is notified that transmission through lockbox device 14 and/or out of system 10 has been successful.

The communication pass-through module 70 may be configured to pass-through communications between router 16 and other entities within system 10. By way of non-limiting example, router 16 may provide communication between computing platform 12 and one or more entities (e.g., server(s)) over a network. Such communication may be transmitted to and from router 16 according to packet-based communication protocol(s), such as TCP/IP, for example. The communication pass-through module 70 may be configured to ensure that when the relays of lockbox device 14 are open (thereby disconnecting router 16 from computing platform 12), information intended for transmission from router 16 to computing platform 12 does not interfere with system performance upon the closing of the relays in lockbox device 14. By way of non-limiting example, communication pass-through module 70 may be configured to discard information from router 16 intended for computing platform 12 if lockbox device 14 does not connect downstream communication device 20 with upstream communication device 18. The communication pass-through module 70 may be configured to return the appropriate messages to router 16 (e.g., TCP error messages).

Returning to FIG. 1, it will be appreciated from the foregoing that the description of upstream communication device 18 and downstream communication device 20 as standalone devices is not intended to be limiting. For example, some or all of the functionality attributed herein to upstream communication device 18 may be included within computing platform 12, and/or some or all of the functionality attributed herein to downstream communication device 20 may be included within router 16.

In some implementations, functionality attributed herein to upstream communication device 18 and downstream communication device 20 is provided by devices that are interchangeable (e.g., capable of functioning as either upstream communication device 18 or downstream communication device 20). To enable this capability, the devices may include the hardware, software, and/or firmware suitable for performance of the functionality of upstream communication device 18 and downstream communication device 20.

Figure 4:
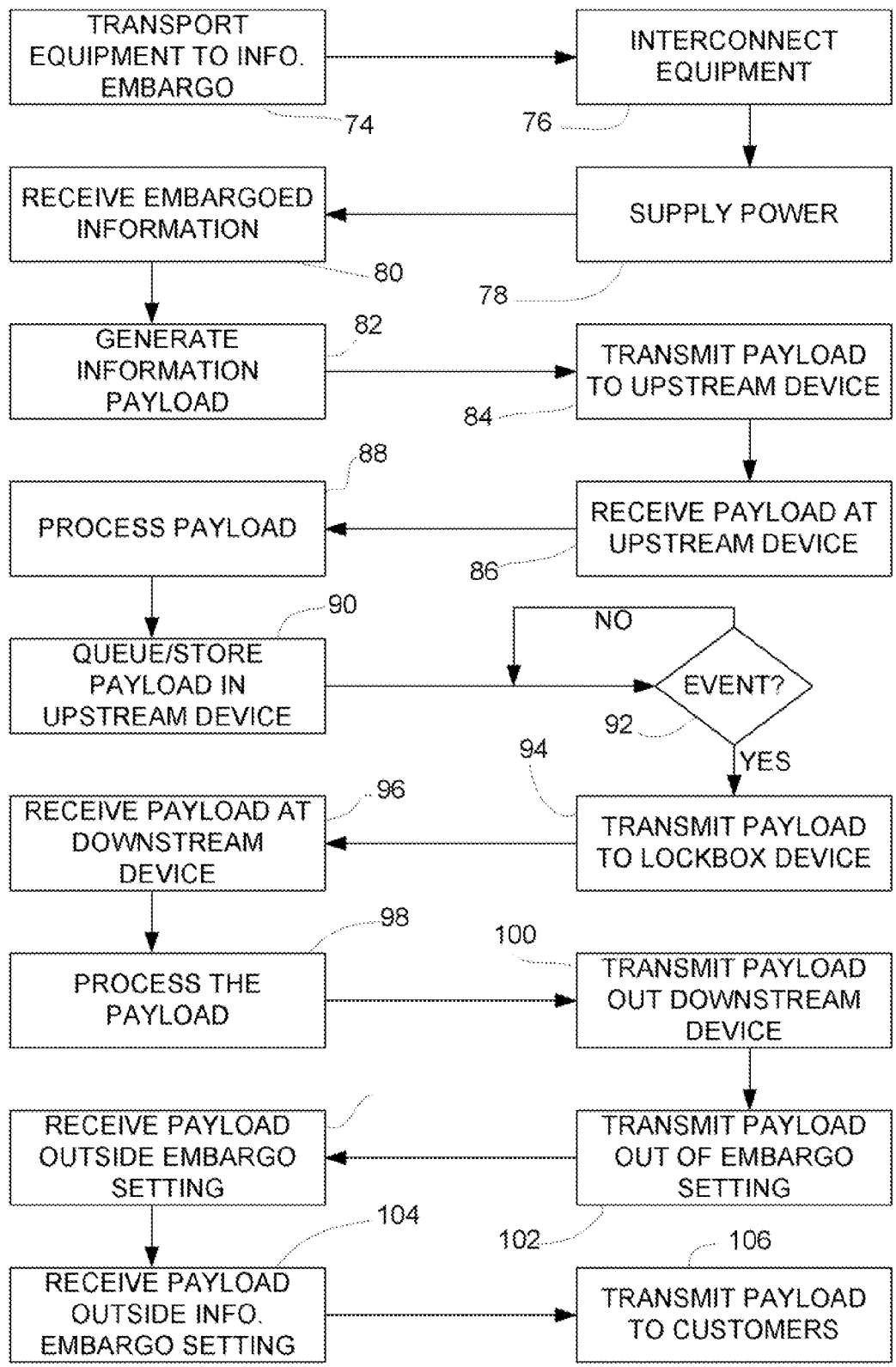
FIG. 4 illustrates a method of transmitting information out of an information embargo setting, according to one or more embodiments of the invention.

FIG. 4 illustrates a method 72 of transmitting information out of an information embargo setting. The operations of method 72 presented below are intended to be illustrative. In some embodiments, method 72 may be accomplished with one or more additional operations not described, and/or without one or more of the operations discussed. Additionally, the order in which the operations of method 72 are illustrated in FIG. 4 and described below is not intended to be limiting.

In some embodiments, method 72 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 72 in response to instructions stored electronically on an electronic storage medium. The one or more processing devices may include one or more devices configured through hardware, firmware, and/or software to be specifically designed for execution of one or more of the operations of method 72.

One or more of the operations of method 72 described below may be implemented in a system that is the same as or similar to (shown in FIGS. 1-3 and described above) configured to electronically transmit information through a lockbox device that is the same as or similar to lockbox device 14 (shown in FIGS. 1-3 and described above). It will be appreciated that this is not limiting, and method 72 may be implemented within a variety of contexts other than the ones illustrated in FIGS. 1-3 and described above.

Method 72 may include an operation 74, at which a set of computing equipment may be transported into an information embargo setting. The set of computing equipment may include, for example, a computing platform, an upstream communication device, a downstream computing device, and/or other equipment. The computing equipment may include one or more components that are the same as or similar to the components of system 10 (shown in FIGS. 1-3 and described above).

At an operation 76, the set of computing equipment may be interconnected. The interconnection of the set of computing equipment may include interconnecting the computing platform with the upstream communication device and a lockbox device such that the upstream communication device is interposed between the computing platform and the lockbox device. The interconnection of the set of computing equipment may include interconnecting the downstream communication device such that the lockbox device is interposed between the upstream communication device and the downstream communication device. Performance of operation 76 may include interconnecting the set of computing equipment similar to, or in the same manner as, the interconnection of the components in system 10 (shown in FIGS. 1-3 and described above).

At an operation 78, power may be supplied to one or more of the computing platform, the upstream communication device, and/or the downstream communication device. The power may be supplied from a battery, a capacitor, a supercapacitor, a wall socket, a generator, and/or from other power sources.

At an operation 80 embargoed information may be received into the computing platform. The reception of embargoed information may be received into the computing platform may be the result of manual entry of the embargoed information, electronic download of the embargoed information, and/or other techniques for inputting information to the computing platform.

At an operation 82, an information payload may be generated on the computing platform. The information payload may include, and/or be generated based on the embargoed information. The information payload may be generated, for instance, by manual entry, via processing of embargoed information on the computing platform, and/or via other techniques for generating an information payload.

At an operation 84, the information payload may be transmitted by the computing platform to the upstream communication device. The transmission may be accomplished via first communication protocol. The performance of operation 84 may be implemented by a computing platform that is the same as or similar to computing platform 12 transmitting the information payload to an upstream communication device that is the same as or similar to upstream communication device 18 (shown in FIGS. 1 and 2, and described above).

At an operation 86, the information payload may be received by the upstream communication device. In some implementations, operation 86 may be performed by an upstream communication module on the upstream communication device that is the same as or similar to upstream communication module 36 (shown in FIG. 2 and described above).

At an operation 88, the information payload may be processed. The processing of the information payload may include preparing the information payload for transmission through the lockbox device and/or out of the system to reduce the amount of time required for the transmission. This may include, for example, converting the information payload that is conducive to communication of the information payload via a first protocol. The first protocol may be the protocol in which the information payload will be transmitted out of the information embargo setting. For example, the first protocol may be a packet-based protocol. At operation 88, once the information payload has been converted to the first protocol, the information payload in the first protocol may be converted into a second communication protocol. This may include serializing the bytes of the information payload in the first protocol. In some implementations, operation 88 may be performed by a payload processing module on the upstream communication device that is the same as or similar to payload processing module 38 (shown in FIG. 2 and described above).

At an operation 90, the information payload may be queued in the upstream communication device. The queuing of the information payload may include storing the information payload to electronic storage associated with the upstream communication device. In some implementations, operation 90 may be performed by a payload queue module on the upstream communication device that is the same as or similar to payload queue module 40 (shown in FIG. 2 and described above).

At an operation 92, a determination may be made as to whether an event has occurred. The event may include the lockbox device being changed from a first state to a second state. In the first state, the information payload may not be communicable through the lockbox device. In the second state, the information payload may be communicable through the lockbox device. The lockbox device may be switched from the first state to the second state, for example, by closing a plurality of relays within the lockbox device. In some implementations, operation 92 may be performed by a connection module on the upstream communication device that is the same as or similar to connection module 42 (shown in FIG. 2 and described above).

At an operation 94, responsive to a detection of an event at operation 92, the payload may be transmitted to the lockbox device by the upstream communication device. This transmission may be accomplished via the second communication protocol. Operation 94 may include simultaneous, separate transmission along separate signal paths to the lockbox device. In some implementations, operation 94 may be performed by a payload transmission module that is the same as or similar to payload transmission module 44 (shown in FIG. 2 and described above).

At an operation 96, the transmission(s) of the information payload made at operation 94 may be received. The transmission(s) may be received at the downstream communication device, after passing through the lockbox device. In some implementations, operation 96 may be performed by a payload reception module that is the same as or similar to payload reception module 62 (shown in FIG. 3 and described above).

In some implementations, reception of the transmission(s) of the information payload may include one or both of synchronizing the individual transmission(s) and/or performing error correction on the individual transmission(s). For example, such synchronization and/or error correction may be performed by a synchronization module and/or an error correction module on the downstream communication device that are similar to or the same as synchronization module 58 and/or error correction module 60 (shown in FIG. 3 and described above).

At an operation 98, the information payload may be processed for transmission out of the information embargo setting. This may include processing the information payload for transmission via a third communication protocol. The third communication protocol may be a parallel and/or packet-based communication protocol. For example, the third communication protocol may be the same as the first communication protocol. In this example, operation 98 may include the de-serialization of the information payload transmission. In some implementations, operation 98 may be performed by a payload processing module that is the same as or similar to payload processing module 64 (shown in FIG. 3 and described above).

At an operation 100, the information payload may be transmitted from the upstream communication device to a networking device configured to communicate with one or more external communication devices. The networking device may include a router, a switch, and/or other networking devices. The information payload may be transmitted to the networking device via the third communication protocol. In some implementations, operation 100 may be performed by a payload transmission module that is the same as or similar to payload transmission module 68 (shown in FIG. 3 and described above).

At an operation 102, the information payload may be transmitted out of the information embargo setting. In some implementations, operation 102 may be performed by the networking device. The networking device may be similar to or the same as router 16 (shown in FIG. 3 and described above).

At an operation 104, the information payload is received at a communication device outside of the information embargo setting. This communication device may be included in, for example, a data center and/or other facilities associated with the entity that transmitted the information payload out of the information embargo setting. The communication device may be associated with a client or customer of the entity that transmitted the information payload out of the information embargo setting.

At an operation 106, the information payload may be disseminated to a set of customers. The information payload may be disseminated to the set of customers by the entity that received the information payload at operation 104.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method comprising:
    (a) accepting, at a first communication device, a signal from a computing platform, the signal conveying an information payload including financial information;
    (b) storing, to electronic storage included with the first communication device, the information payload; and
    (c) transmitting the stored information payload from the first communication device to a second communication device through a lockbox device.

2. The method of claim 1, wherein the financial information is being released by the United States government in an information embargo setting.

3. The method of claim 1, wherein the financial information is being released by the Canadian government in an information embargo setting.

4. The method of claim 1, wherein the step of transmitting further comprises detecting an event, and triggering the transmission of the stored information payload from the first communication device to the second communication device through the lockbox device responsive to detection of the event.

5. The method of claim 4, wherein the detected event comprises the closing of a relay within the lock box device.

6. The method of claim 1, wherein the signal accepted by the first communication device conveys the information payload according to a first protocol, wherein the step of transmitting comprises transmitting the information payload from the first communication device to the second communication device through the lockbox device via a second protocol, and wherein the first protocol is different than the second protocol.

7. The method of claim 6, further comprising converting the information payload from a format associated with the first protocol to a format associated with the second protocol, and wherein the information payload is stored in the format associated with the second protocol.

8. The method of claim 6, wherein the first protocol is a packet-based communication protocol.

9. The method of claim 6 wherein the second protocol is a serial communication protocol.

10. The method of claim 1, wherein the first communication device includes an internal power supply.

11. The method of claim 1, wherein the computing platform comprises a journalist workstation.

12. A method comprising:
    (a) transporting a set of computing equipment into an information embargo setting, the set of computing equipment comprising a computing platform, a first communication device, and a second communication device, the first communication device being physically distinct from the computing platform;
    (b) interconnecting the personal computing device, the first communication device, the second communication device, and a lockbox device such that the first communication device is electrically interposed between the computing platform and the lockbox device, and such that the lockbox device is interposed between the first communication device and the second communication device;
    (c) supplying electrical power to the computing platform, the first communication device, and the second communication device;
    (d) transmitting a signal from the personal computing device to the first communication device, the signal conveying an information payload including financial information;
    (e) storing, to electronic storage included with the first communication device, the information payload; and
    (f) transmitting the stored information payload from the first communication device to a second communication device through a lockbox device.

13. The method of claim 12, further comprising electronically communicating the information payload from the second communication device to one or more communication devices outside of the information embargo setting.

14. The method of claim 13, further comprising:
    (a) receiving, in at a communication device outside of the information embargo setting, the information payload;
    (b) transmitting the information payload to a set of customers.

15. The method of claim 12, wherein the computing platform comprises a journalist workstation.

16. A communication device configured to transmit an information payload received from a computing platform through a lockbox device that selectively connects and disconnects the communication device with a second communication device configured to electronically disseminate information, the communication device comprising:
    an upstream communication port configured to communicate information between the communication device and the computing platform;
    a plurality of downstream communication ports configured to communicate information through the lockbox device, wherein the downstream communication ports comprise a first downstream communication port, and a second downstream communication port, and wherein the first downstream communication port and the second downstream communication port each include a plurality of differential signal paths that enable communication of information through the lockbox device; and
    a processor, the processor being configured to determine a current connection status of the lockbox device, and responsive to a determination that the lockbox device is currently connecting the communication device with the second communication device, to transmit an information payload to the second communication device through the lockbox device, wherein the processor is further configured such that the transmission of the information payload comprises a separate serial transmission of the information payload over each of a plurality of differential signal paths, the plurality differential signal paths being included in the first downstream communication port and/or the second downstream communication port.

17. The communication device of claim 16, wherein the transmission of the information payload comprises a first serial transmission of the information payload over at least one of the differential signal paths included in the first downstream communication port and a second serial transmission of the information payload over at least one of the differential signal paths included in the second downstream communication port.

18. The communication device of claim 17, wherein the plurality of downstream communication ports further comprise a third downstream communication port, and wherein the transmission of the information payload comprises a third serial transmission of the information payload over a differential signal path included in the third communication port.

19. The communication device of claim 16, wherein the plurality of downstream communication ports comprise two or more of an 8-position-8-contact port, a registered jack 12 port, a registered jack 11 port, a registered jack 14 port, a registered jack 25 port, a DB-25 port, or an RS-232 port.

20. The communication device of claim 16, further comprising electronic storage configured to store an information payload received by the communication device from the computing platform until the processor determines that the lockbox device is currently connecting the communication device with the second communication device.

21. The communication device of claim 16, wherein the processor is further configured to receive a transmission of the information payload from the computing platform over the upstream communication port in a packet-based format, and to convert the information payload into a serial format for transmission to the second communication device.

22. The communication device of claim 16, wherein the processor is configured to receive information from the second communication device through the lockbox device in a packet-based format, and to communicate the information to the computing device via the upstream communication port in the packet-based format.

23. The communication device of claim 16, wherein the computing platform comprises a journalist workstation.

24. A communication device configured to receive an information payload from a second communication device through a lockbox device that selectively connects and disconnects the communication device with the second communication device, the communication device comprising:
  a downstream communication port configured to communicate information between the communication device and a network device configured to electronically disseminate information;
  a plurality of upstream communication ports configured to communicate information through the lockbox device, wherein the upstream communication ports comprise a first upstream communication port, and a second upstream communication port, and wherein the first upstream communication port and the second upstream communication port each include a plurality of differential signal paths that enable communication of information through the lockbox device; and
  a processor, the processor being configured to receive separate serial transmissions of the information payload over each of a plurality of differential signal paths, the plurality differential signal paths being included in the first upstream communication port and/or the second upstream communication port, to convert the information payload to a packet-based format, and to transmit the information payload in the packet-based format to the network device.

25. The communication device of claim 24, wherein the processor is configured to receive separate serial transmissions of the information payload including a first serial transmission of the information payload over at least one of the differential signal paths included in the first upstream communication port and a second serial transmission of the information payload over at least one of the differential signal paths included in the second upstream communication port.

26. The communication device of claim 25, wherein the plurality of upstream communication ports further comprise a third upstream communication port, and wherein the processor is further configured to receive the separate serial transmissions of the information payload including a third serial transmission of the information payload over a differential signal path included in the third communication port.

27. The communication device of claim 24, wherein the plurality of upstream communication ports comprise two or more of an 8-position-8-contact port, a registered jack 12 port, a registered jack 11 port, a registered jack 14 port, a registered jack 25 port, a DB-25 port, or an RS-232 port.

28. The communication device of claim 24, wherein the processor is further configured to determine which of the separate serial transmissions of the information payload has been completed first, to convert copy of the information payload received in the first completed transmission of the information payload to a packet-based format, and to transmit the information payload to the network device in the packet-based format.

29. The communication device of claim 24, wherein processor is configured such that converting the information payload to the packet-based format comprises oversampling the information payload in serial format to reassemble the information payload without using a clock.

30. The communication device of claim 24, wherein the processor is configured to receive information from the network device in a packet-based format via the downstream communication port, and to communicate the information to the second communication device via the lockbox device in the packet-based format.

31. A communication device configured to transmit an information payload received from a computing platform through a lockbox device that selectively connects and disconnects the communication device with a second communication device configured to electronically disseminate information, the communication device comprising:
  an upstream communication port configured to communicate information between the communication device and the computing platform;
  a plurality of downstream communication ports configured to communicate information through the lockbox device;
  electronic storage configured to electronically store information; and
  a processor, the processor being configured to receive an information payload from the computing platform via the upstream communication port, to manage storage of a copy of the received information payload to the electronic storage, to determine a current connection status of the lockbox device, and responsive to a determination that the lockbox device is currently connecting the communication device with the second communication device, to access the stored copy of the information payload, and to transmit the information payload to the second communication device through the lockbox device via the downstream communication ports.

32. The communication device of claim 31, wherein the processor is further configured to convert the information payload to a format suitable for serial transmission, and to manage storage of a copy of the information payload to the electronic storage in the format suitable for serial transmission.

33. The communication device of claim 32, wherein the processor is configured such that transmission of the information payload to the second communication device via the downstream communication ports comprises making separate serial transmissions of the copy of the information payload stored to the electronic storage via separate ones of the downstream communication ports.

34. The communication device of claim 33, wherein the processor is configured such that transmission of the information payload to the second communication device via the downstream communication ports comprises making repeated serial transmissions of the information payload over the downstream communication ports until an indication is received from the second communication device that the information payload has been received.

35. The communication device of claim 31, wherein the downstream communication ports comprise two or more of an 8-position-8-contact port, a registered jack 12 port, a registered jack 11 port, a registered jack 14 port, a registered jack 25 port, a DB-25 port, or an RS-232 port.

36. The communication device of claim 31, wherein individual ones of the downstream communication ports include a plurality of differential signal paths that enable serial communication of information through the lockbox device.

37. The communication device of claim 31, wherein the computing platform comprises a journalist workstation.

* * * * *